A. BROWN.
COLLAR BAR.
APPLICATION FILED APR. 13, 1920.

1,351,613.  Patented Aug. 31, 1920.

WITNESSES

INVENTOR
Albert Brown
BY Munn & Co
ATTORNEYS

UNITED STATES PATENT OFFICE.

ALBERT BROWN, OF NEW YORK, N. Y., ASSIGNOR OF ONE-THIRD TO MAX JACOB GRAUER AND ONE-THIRD TO JOSEPH LIPSCHUTZ, BOTH OF NEW YORK, N. Y.

COLLAR-BAR.

1,351,613.  Specification of Letters Patent.  Patented Aug. 31, 1920.

Application filed April 13, 1920. Serial No. 373,678.

*To all whom it may concern:*

Be it known that I, ALBERT BROWN, a citizen of the United States, and a resident of the city of New York, borough of Manhattan, in the county and State of New York, have invented a new and Improved Collar-Bar, of which the following is a description.

My invention relates to collar bars for use at the front of a soft collar for retaining the adjacent ends or terminals thereof in position and more particularly relates to collar bars of the type presenting clamps at the ends thereof between the members of which the opposed lateral edge portions of the collar are adapted to be received and clamped.

The desiderata in devices of the indicated character are to provide for an effective clamping of the collar, for permanency of the clamping action, the facility with which the device may be applied to the collar and the neatness with which the collar edges are accommodated; as well as the esthetic attributes of the collar bar, cheapness of manufacture and the facility with which the elements entering into the collar bar may be formed and assembled.

The prime object of my invention is to provide an improved collar bar in which the stated objects are attained to the maximum degree.

Reference is to be had to the accompanying drawings forming a part of this specification, it being understood that the drawings are merely illustrative of one example of the invention.

Figure 1:
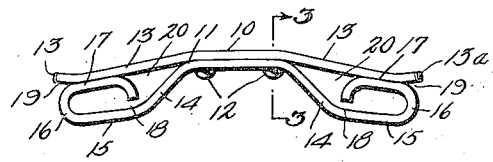
Figure 1 is a plan view of the collar bar embodying my invention.
Figure 2:
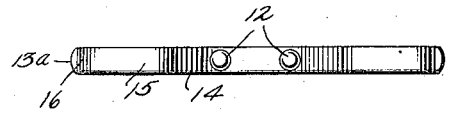
Fig. 2 is a rear elevation thereof.
Figure 3:
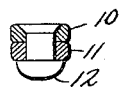
Fig. 3 represents a cross section at the line 3—3, Fig. 1, the fastening rivet being in elevation.
Figure 4:
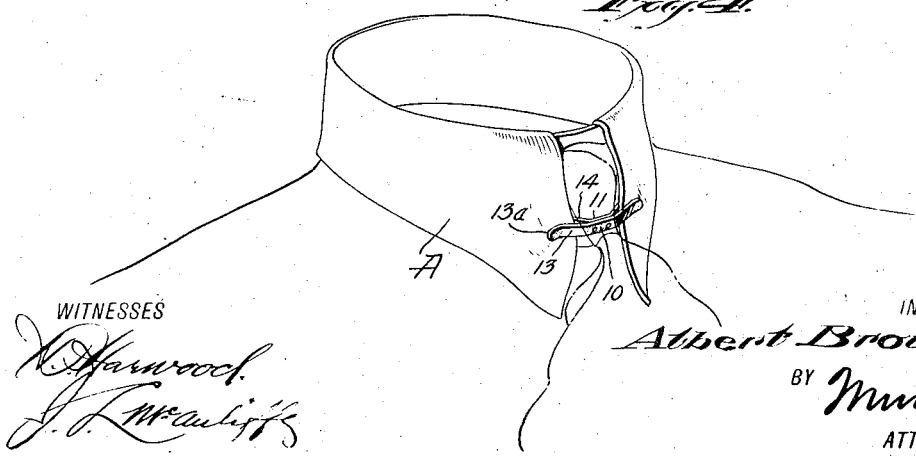
Fig. 4 is a perspective view showing the collar bar applied.

In carrying out my invention in practice, the collar bar is formed of an elongated front element 10 and an elongated rear element designated generally by the numeral 11. At the central portions of the respective bars, the same are parallel to lie in close contact and said portions are fastened in any approved manner, advantageously by means of rivets 12. The front bar 10 is given a form reflecting esthetic consideration and adapted for coaction with the end portions of the rear bar in clamping the collar indicated at A, Fig. 4. In the illustrated example said front bar is deflected rearwardly at both ends as at 13 from its central fastened portion.

The rear bar 11 at both sides of the fastened central portion is deflected rearwardly to present outwardly disposed oblique portions 14 which are at a greater angle to the central portion than the adjacent rearwardly deflected portions 13 of the front bar and the material of said rear bar is carried laterally outward as at 15 from each oblique portion and then bent forwardly preferably on curved lines as at 16 and returned laterally inward as at 17 between the front bar 13 and the body of the rear bar, the terminals 18 being disposed rearwardly toward the inner surface of the body of said rear bar. The terminals 13$^a$ of the deflected ends 13 of the front bar form an angle with the front terminals of the forwardly curving portions 16 which constitute the ends of the rear bar, thereby presenting an angle 19 between the terminals 13$^a$ and said ends 16.

It will be observed that the inturned members 17 are elongated to present a substantial surface opposed to the inner surface of the deflected portions 13 of the front bar and approximately follows the lines of the latter. Further, it will be noted that the rearwardly disposed terminals 18 of the rear bar are positioned laterally outward from the oblique portions 14 of said bar leaving a space 20 within the collar bar and laterally inward from said terminal 18.

With the described arrangement the flare at the angle 19 affords guidance for a ready entrance of the lateral edges of the collar when the bar is being applied that the edge portions of the collar may be moved to lie in the spaces 20 between which flaring angles and spaces there are opposed surfaces of substantial area adjacent to each other presented by the inturned members 17 and the adjacent portions of the front bar. It will be readily understood also that the described form of the rear bar at the ends lends strength not only to the rear bar 11 but to the coacting clamping elements and the resiliency of the clamp is therefore preserved to the maximum degree in addition to providing an ample clamping action.

In the preferred form of the invention the terminals 18 are disposed against the opposed forward surfaces of the body of the rear bar 11. The resiliency of the clamp is preferably attained in practice solely through the medium of the front bar 10, the rear bar being essentially rigid or non-yielding. By thus not distributing the resiliency in the front and rear elements constituting the clamp greater strength may be given to both bars to the end that the resiliency be preserved. At the same time the front element of the clamp may be made sufficiently yieldable for the ready entrance of the collar material. The described form of the rear bar with its ends returned laterally inward materially adds to the strength and makes for effective clamping action by the resiliency of the front bar. Moreover, by bringing the rearwardly disposed terminals 18 against the body of the rear bar, the returned clamping portion 17 is prevented from yielding relatively to the body of the bar, thereby contributing to the rigidity of the bar as a whole.

I would state in conclusion that while the illustrated example constitutes a practical embodiment of my invention, I do not limit myself strictly to the actual details herein illustrated, since manifestly the same can be considerably varied without departure from the spirit of the invention as defined in the appended claims.

Having thus described my invention, I claim:

1. A collar bar having clamps at the ends thereof, each clamp comprising front and rear elements, one of said elements of each clamp having the end portion thereof return bent presenting an elongated member extending laterally inward along and in close contact with the opposed inner surface of the coacting clamp element, there being clearance space laterally inward from said returned member and said contacting surfaces.

2. A collar bar having clamps at the ends thereof, each clamp comprising front and rear elements, one of said elements of each clamp having the end portion thereof return bent presenting an elongated member extending laterally inward along and in close contact with the opposed inner surface of the coacting clamp element, there being clearance space laterally inward from said returned member and said contacting surfaces, the extreme inner end of said returned portion being bent away from the plane of contact of said opposed surfaces.

3. A collar bar comprising an elongated front element and an elongated rear element, the two being rigidly united adjacent to the central portions thereof, said front element being deflected rearwardly from the fastened central portion, said rear element being deflected rearwardly and outwardly adjacent to the fastened central portion and at a greater angle than the deflection of the adjacent portion of the front element, the ends of said rear element being returned between the body of said element and the front element and presenting an elongated front surface coacting with the opposed rear surface of the front element to constitute with said front element clamps at the ends of the collar bar.

ALBERT BROWN.